United States Patent
Akopyan (10) Patent No.: US 6,984,352 B1
(45) Date of Patent: Jan. 10, 2006

(54) DIELECTRIC MOLD FOR UNIFORM HEATING AND MOLDING OF POLYMERS AND COMPOSITES IN MICROWAVE OVENS

(76) Inventor: Razmik L. Akopyan, 1945 Jamestown Dr., Olathe, KS (US) 66202

( * ) Notice: Subject to any disclaimer, the term of this patent is extended or adjusted under 35 U.S.C. 154(b) by 172 days.

(21) Appl. No.: 10/157,324

(22) Filed: May 29, 2002

(51) Int. Cl.
B29C 33/40 (2006.01)

(52) U.S. Cl. .............................. 264/219; 425/174.8 R; 425/174.8 E (58) Field of Classification Search ................ 264/219, 264/220, 224, 225, 226, 227; 425/174.8 E, 425/174.8 R, 174.4; 249/114.1
See application file for complete search history.

(56) References Cited

U.S. PATENT DOCUMENTS

| | | | |
|---|---|---|---|
| 2,407,833 A | 9/1946 | Jablonsky et al. ....... 156/274.8 |
| 2,421,096 A | 5/1947 | Vogt ........................ 264/36.14 |
| 2,421,097 A | 5/1947 | Lakso ..................... 264/36.14 |
| 2,438,952 A | 4/1948 | Te Grotenhuis ............. 264/449 |
| 2,595,502 A | 5/1952 | Aicher et al. ............... 425/160 |
| 2,626,426 A | 1/1953 | Bosomworth ............... 249/135 |
| 2,754,546 A | 7/1956 | Mason et al. .................. 425/41 |
| 3,294,879 A | 12/1966 | Jacobs ........................ 264/417 |
| 3,475,522 A | 10/1969 | Garibian et al. ............ 264/422 |
| 3,519,517 A | 7/1970 | Dench ........................ 219/759 |
| 3,777,099 A | 12/1973 | Levinson .................... 219/730 |
| 3,851,131 A | 11/1974 | Johnston et al. ............ 219/693 |
| 4,110,139 A | 8/1978 | Mashida ...................... 156/79 |
| 4,268,238 A | 5/1981 | Marc .................... 425/174.8 E |
| 4,269,581 A | 5/1981 | Ury et al. ................. 425/174.4 |
| 4,307,277 A | 12/1981 | Maeda et al. ............... 219/759 |
| 4,323,745 A | 4/1982 | Berggren .................... 219/697 |
| 4,441,876 A | 4/1984 | Marc .................... 425/174.8 E |
| 4,454,403 A | 6/1984 | Teich et al. ................. 219/729 |
| 4,456,806 A | 6/1984 | Arimatsu .................... 219/710 |
| 4,466,938 A | 8/1984 | Gigl et al. ................... 264/332 |
| 4,477,707 A | 10/1984 | Kim ............................ 219/697 |
| 4,481,159 A | 11/1984 | Itoh ............................ 264/403 |
| 4,524,037 A | 6/1985 | Marc .......................... 264/413 |
| 4,558,198 A | 12/1985 | Levendusky et al. ....... 219/728 |
| 4,617,439 A | 10/1986 | Lespinats et al. ........... 219/759 |
| 4,810,846 A | 3/1989 | Holcombe et al. .......... 219/762 |
| 4,851,167 A | 7/1989 | Marc .......................... 264/421 |
| 4,880,578 A | 11/1989 | Holcombe et al. .......... 264/432 |
| 4,939,330 A | 7/1990 | Berggren et al. ........... 219/686 |
| 4,963,709 A | 10/1990 | Kimrey, Jr. ................. 219/716 |
| 5,082,436 A | 1/1992 | Choi et al. ............ 425/174.8 R |
| 5,139,407 A | 8/1992 | Kim et al. ............ 425/174.8 E |
| 5,166,484 A | 11/1992 | Young et al. ................ 219/684 |
| 5,202,541 A | 4/1993 | Patterson et al. ........... 219/745 |
| 5,258,596 A | 11/1993 | Fabish et al. ............... 219/728 |
| 5,290,490 A | 3/1994 | Nied et al. .................. 264/491 |

(Continued)

Primary Examiner—Robert Davis
Assistant Examiner—Emmanuel Luk
(74) Attorney, Agent, or Firm—Erickson & Kleypas, L.L.C.

(57) ABSTRACT

A mold for uniformly heating working material to form a workpiece using a microwave oven. Uniform heating of a workpiece of variable thickness may be obtainied in a microwave oven with a uniform electric field in its cavity if the mold material is selected to have a dielectric constant and a thermosensitivity equal to that of the working material. The thermosensitivity of a material is its dissipation factor divided by the product of its density and specific heat. Uniform heating of a uniformly thick workpiece can be obtained in a conventional microwave by selecting the mold material to have a relative thermosensitivity equal to that of the working material. The relative thermosensitivity of a material is its dissipation factor divided by the product of its dielectric constant, density, and specific heat.

15 Claims, 2 Drawing Sheets

U.S. PATENT DOCUMENTS

| | | |
|---|---|---|
| 5,321,222 A | 6/1994 | Bible et al. .................. 219/745 |
| 5,406,058 A | 4/1995 | Lipp .......................... 219/774 |
| 5,420,404 A | 5/1995 | Goodman et al. .......... 219/775 |
| 5,466,144 A | 11/1995 | Adams et al. ........... 425/174.4 |
| 5,521,360 A | 5/1996 | Johnson et al. ............. 219/709 |
| 5,593,610 A | 1/1997 | Minerich et al. ........... 219/728 |
| 5,607,612 A | 3/1997 | Held et al. ................. 219/759 |
| 5,609,891 A * | 3/1997 | Delaunay et al. ..... 425/174.8 E |
| 5,639,518 A | 6/1997 | Ando et al. ................. 427/544 |
| 5,659,972 A | 8/1997 | Min et al. .................... 34/255 |
| 5,804,801 A | 9/1998 | Lauf et al. .................. 219/759 |
| 5,811,769 A | 9/1998 | Schiffmann et al. ........ 219/762 |
| 5,813,134 A | 9/1998 | Min et al. ..................... 34/255 |
| 5,844,217 A | 12/1998 | Hawley et al. ............. 219/762 |
| 5,961,871 A | 10/1999 | Bible et al. ................. 219/709 |
| 6,034,363 A | 3/2000 | Barmatz et al. ............ 219/750 |
| 6,241,929 B1 | 6/2001 | Akopyan .................... 264/219 |
| 6,365,885 B1 | 4/2002 | Roy et al. ................... 219/750 |
| 6,486,455 B1 | 11/2002 | Merabet ...................... 219/725 |

* cited by examiner

DIELECTRIC MOLD FOR UNIFORM HEATING AND MOLDING OF POLYMERS AND COMPOSITES IN MICROWAVE OVENS

BACKGROUND OF THE INVENTION

This invention relates generally to microwave processing of high performance polymers, composites and the sintering of ceramics, and more specifically to the design of molds for processing of such materials including the selection or modification of materials to form the mold to provide for uniform heating of polymers, composites or ceramics by microwave energy.

Efforts to use radio frequency (RF) or microwave processing of polymers and composites has been pursued over the past few decades and yields substantial advantages. In contrast to conventional thermal treatments, the advantages of RF and microwave processing include rapid volumetric heating, avoidance of overheating at the surface, reduced processing time and reduced degradation of the processed polymers. RF dielectric heating may be efficient in applications where uniform volumetric heating is required for workpieces of large volumes and dimensions. RF heating has found a wide range of applications including the drying of wood, the gluing of wood and plastic products, and plastic sealing. Such applications usually employ relatively low radio frequencies (f), i.e. f=13.56 or 27.12 MHz, which are permitted for commercial use. Many applications for RF heating are found in the automobile industry. For example, RF bonding techniques have been used successfully for gluing of two parts of the back door of the ZX and XANTIA model automobiles. In my U.S. Pat. No. 6,241,929 (hereafter the "929" Patent) I disclosed a method for molding objects of complex shape using RF heating. Known techniques for RF dielectric heating are characterized by the presence of two or more metal electrodes electrically separated from each other across which an RF electrical field is applied from a generator, with the working material being placed between the metal electrodes.

In most cases, the efficiency of dielectric heating increases with an increase in the frequency of the electromagnetic field. The preferred frequency whose use is permitted is the frequency allocated for commercial use of microwave, i.e. f=2450±50 MHz. At elevated frequencies of the electromagnetic field, the same heat rating for a particular material may be achieved with much lower strengths of electric field in comparison with lower frequencies. For example, the field strength E will be reduced approximately 10 times at the frequency f=2450 MHz in comparison with that at f=27.12 MHz providing same power rating (see formula (1)). At considerably reduced field strengths, the problem of arcing, which is very common for radio frequencies, will be eliminated completely.

At such high microwave frequencies, the design of the applicator for heating the work material is significantly different from an RF applicator with metal plates and conventional open wire circuits. Microwave processing is generally performed within a metallic microwave applicator, which may be a traveling wave applicator, resonant single mode or multimode applicators. The size of such applicators usually exceeds several wavelengths at a given frequency. By definition, microwave frequencies range from 300 MHz to 300 GHz and therefore the applicator size may be about 1 meter or more. The single mode and traveling wave applicators may be used in processing simple material shapes such as fibers. However, the multimode applicator has the capability of coupling microwave energy onto materials of large and complex shape.

The multimode applicator generally comprises a closed metal box having a cavity or chamber and some means of coupling to a power source or generator such as waveguides or antennas. The dimensions of the cavity should be several wavelengths long in at least two dimensions. Such a box will support a large number of resonant modes in the applicator cavity in a given frequency range. When the applicator is not loaded, each of these modes is characterized by a sharp resonance at a given frequency. It is important to provide as many of these modes as possible to lie near the operating frequency of microwave generator (or generators). When such an applicator is loaded with a microwave absorbing work material, the resonance curves will overlap to give a continues coupling into the load. The overall distribution of electromagnetic energy is not uniform throughout the microwave cavity or the work material resulting in high and low energy field areas. Such hot and cold spots can be observed in household microwave ovens and are tolerated for food applications, because relatively high thermal conductivity of water containing food results in reductions of the thermal variations established due to non-uniform heating. But this is not the case for high performance polymers since most of these polymers exhibit very poor thermal conductivity. Any attempt to heat the polymer work material in a conventional microwave oven without specially designed molds will lead to overheating or burns of the polymer in some places while in other its places will be under heated or cured. Uniformity of heating is therefore of great importance in the case of polymer processing.

There have been numerous attempts in the prior art to achieve uniform microwave fields in the volume of a workpiece to be heated. Examples of such techniques include multiple slot entry techniques or the development of "stirred" multimode cavities, in which the field is constantly scanning in order to average out hot and cold spots. While these methods provide some improvement, it has not been possible to achieve desired uniformity of temperature field in the work material. Better uniformity of field can be obtained at a frequency of 2450 MHz by substantially increasing the cavity dimensions (approximately 100 wavelengths) which will require a very large microwave power supply to produce sufficient energy density within the cavity of 12 meters size. A more feasible way is to employ higher frequencies, as high as 28 GHz, where 100 times wavelength is approximately 1 meter in size. However, operation of microwave ovens at a frequency of 28 GHz is considered too expensive and is out of the permitted frequency range.

Another known technique is the excitation of multiple standing-wave modes in the microwave cavity by a plurality of magnetrons. For example, a commercial microwave oven designed for the food industry, such as Panasonic model NE-3280, has 3.2 kW of microwave power and is powered by four magnetrons. Uniformity of heating is significantly improved using such a microwave oven. Polymer processing in such microwave ovens will require specially designed molds for each particular polymer or polymer groups.

Recently developed variable frequency microwave (VFM) ovens may offer an advantage in polymer processing. The advantage of VFM processing over conventional fixed frequency microwave processing is its ability to provide uniform heating over a large volume of a work material (the material to be molded). With VFM heating, a large number of frequencies are introduced into the cavity sequentially during sweeping of frequency in a wide frequency range. Each incident frequency establishes a different pattern of heating. When a sufficient bandwidth is used, time-average uniform heating can be achieved with proper adjustment of the frequency sweep rate and sweep range. A disadvantage of such a technique is that presently the maximum microwave power available does not exceed 500 W, and VFM ovens are not generally commercially available. The price of such ovens is expected to be very high in comparison with fixed frequency microwave ovens. Also, VFM ovens operate in the range of frequencies not permitted for commercial use.

A method for the uniform heating of a workpiece or work material in a microwave oven operating at a frequency of 2450 MHz is disclosed in U.S. Pat. No. 5,202,541. The workpiece assembly represents a multilayer structure of ceramic components placed in a powder bed and surrounded by metal rings stacked vertically in the direction of electric field. The metal rings are electrically separated from each other. The number, dimensions and separation of employed rings in any particular case is determined by trial and experimentation to achieve the desired uniform electrical field. Alternatively, the rings may be placed snugly against one another to create a conductive wall along the electric force lines and surrounding the crucible containing workpiece assembly. It is noted that depending on the dimensions and nature of the load assembly, the location and extent of the various hot and cold regions can vary.

Experimentally it has been shown that regions with undesirably wide variations of temperature arise in the load whenever an attempt is made to increase the size of workload assembly and quantity of heating ceramic components. In the description of U.S. Pat. No. 5,202,541 there is no analysis of the heat exchange between the workpieces, the powder bed, the crucible and the metal rings and how the difference of their dielectric, thermal and mechanical properties will affect the uniformity of heating. It is evident that workpieces may be heated uniformly only if temperature rise ratings of workpieces and surrounding medium are equal. At this condition zero heat exchange between different components will allow the formation of a uniform temperature field over entire volume of assembly. As it is shown hereafter the matching of parameter $\tan\delta/\epsilon c\rho$ of the work material and surrounding media adjacent to workpiece is necessary to provide for uniform heating of the whole assembly.

Another drawback of this method relates to the working condition of the microwave generator. The presence of tall conducting metal rings having a total height comparable with the dimension of microwave cavity may cause significant reflection of microwave energy toward the generator and may affect its safety during operation.

U.S. Pat. No. 4,307,277 discloses a method for microwave heating of a ceramic work-piece. A work piece is surrounded by an inner casing, which is made of microwave absorbing material. An intermediate casing made of refractory insulator covers inner casing for thermal insulation purpose. The whole assembly is placed inside a conventional household microwave oven and exposed to microwave radiation. The work material does not absorb microwave energy and is heated by heat radiation from the inner layer. Such and apparatus may provide uniform heating only of a small volume work-piece since heat flows from its surface to the center due to thermal conductivity. Such a method cannot be used for uniform heating of thick or massive work-pieces and will face the same challenges as conventional methods employing infrared radiation.

U.S. Pat. No. 4,617,439 describes a method for uniform heating of a relatively thin planar panel of work material placed between two metal plates and in intimate contact therewith. Such a sandwich structure of metal plates and work material may be stacked in the direction of the electric field. It has been stated that the effect of electric field guiding by the metal plates allows for the control of the distribution of energy within the work material to be heated. The plurality of stacked panels with metal plates therebetween provides an even distribution of energy in all of the panels. In such a method, the metal panels may have different contours to shape the layers of work material into the desired profile by means of compression and heat. During exposure of the assembly to microwave radiation, the metal panels will not be heated by the microwave energy due to the skin-effect. The purpose of these metal plates is to guide the electric field and equalize the temperature between hot and cold spots in the work material due to their high thermal conductivity. Actually, these plates work as high thermal conductivity heat absorbers. On one hand, the intimate contact of the metal plates with the work material will equalize the temperature in the longitudinal direction between hot and cold spots, but on the other hand, it will cause the flow of heat from the heated work material to the cold plates resulting in radiation of heat from their surfaces and temperature gradients in the direction normal to their interface. To avoid this disadvantage in the present invention, metal plates with high thermal conductivity are placed between the inner mold layer and the work material. With the proper selection of material to form the mold, thermal gradients on the interface between the mold and the work material may be significantly reduced in both and longitudinal and normal directions.

SUMMARY OF THE INVENTION

The present invention provides a molding apparatus comprising a mold formed of mold material and having a cavity therein for placing a polymer material or working material to be molded by microwave energy. The apparatus and associated method are used for heating and molding of both variable thickness and planar workpieces or working material and providing uniform heating through their entire volumes. The mold is positioned in the cavity of a multimode microwave oven and is exposed to microwave radiation to heat the mold and workpiece. The mold is defined by at least two mold halves, each of them at least in part, forms the mold cavity when advanced toward each other into abutting relationship. The molding apparatus also includes means for compression of the mold halves during heating and cooling cycles to form the desired shape of work article. The means for compressing the mold halves are made of microwave transparent materials.

In accordance with the main concept of the present invention, the uniform heating of variable thickness polymer workpieces in a microwave oven may be provided if certain conditions are satisfied:

the microwave oven is specially design to produce a substantially uniform electric field or uniform microwave field in its cavity; and polymer heating is performed in a specially designed mold.

The material forming the mold halves and the workpieces or working material are selected to simultaneously satisfy two criteria involving the following physical parameters of the material: the dielectric constant ($\epsilon$), the dissipation factor ($\tan\delta$), the specific heat (c), and the density ($\rho$). The first relation requires the dielectric constant of the mold and working materials to be equal, so as to provide a uniform electric field and, hence, uniform dissipation of microwave energy in the workpiece. As used herein uniform microwave field will be considered synonymous with a uniform electric field generated by the microwave oven. The second relation requires the physical parameter of the dissipation factor divided by the product of specific heat and density, $\tan\epsilon/c\rho$, to be substantially the same for both materials. For purposes of this application the parameter $\tan\epsilon/c\rho$ for a particular material may be referred to as that material's thermosensitivity. The equality of the thermosensitivity of the two materials maintains zero temperature gradient across the interface between the mold material and the working material during the heating cycle, which eliminates heat flow through the interface and thus provides an even temperature field throughout the entire volume of the workpiece.

In one embodiment, the present invention relates to the preheating and molding of planar working material in a microwave oven. Alternatively, the preheating of planar sections or slabs of working material for later molding in existing shaping molds may be performed in either conventional microwave ovens or in microwave ovens having a uniform electric field in their resonance cavity. The presence of planar conductive dielectric mold layers along with metal plates placed between the dielectric mold material and the working material of uniform thickness will correct the electric field in the mold cavity in a manner which provides uniform heating of the working material. The mold design for planar or uniform thickness parts is simpler than that for variable thickness parts and requires controlling only one parameter of the mold material. In accordance with this concept, the planar mold material is selected or modified to have a relative thermosensitivity, $\tan\delta/\epsilon c\rho$, equal to that of working material. The equality of the relative thermosensitivities of both materials provides equal temperature rise ratings in the mold material and the working material and maintains zero temperature gradient across the polymer-mold interface up to selected temperature during the heating cycle. This eliminates heat flow through the polymer-mold interface and thus provides uniform heating of the workpiece or working material throughout its volume.

In a second embodiment, the present invention further reduces the total heat energy which accumulates in the mold and hence reduces the microwave energy losses. This is accomplished by forming the mold from at least two different compositions of mold material. The composition of the mold material of an inner mold layer adjacent or closest to the mold cavity should have approximately the same thermosensitivity (or relative thermosensitivity) as the working material. An outer layer of the mold, should have a thermosensitivity (or relative thermosensitivity) which is significantly lower than that of both the inner layer and the working material to reduce total heat energy accumulated in the mold.

The materials used to form the mold layers are created by adding selected materials or additives to a base mold material to obtain as close as practical the desired controlling value of thermosensitivity (or relative thermosensitivity) for the inner mold layer. The thermosensitivity (or relative thermosensitivity) of the outer mold layer is preferably at least ten times or one thousand percent less then the same parameter for the inner mold layer.

OBJECTS AND ADVANTAGES OF THE INVENTION

It is an object of present invention to provide a microwave heating process for heating and molding of various working materials in a microwave oven. It is a further object of the present invention to heat workpieces of variable thickness in a microwave oven having a substantially uniform electric field in its cavity. Another object of this invention is to provide a microwave heating process for heating and molding of planar workpieces in conventional microwave oven employing simplified mold. It is a further object of this invention to provide an apparatus, which will provide the necessary conditions for uniform heating of a polymer working material to be molded in the mold. A further object of the present invention is to reduce the total heat energy accumulated in the mold and hence reduce the microwave energy losses.

Other objects and advantages of this invention will become apparent from the following description taken in conjunction with the accompanying drawings wherein are set force, by way of illustration and example, certainly embodiments of this invention.

DETAILED DESCRIPTION OF THE INVENTION

This invention relates to microwave processing of polymers and composites, including items of both uniform thickness or variable thickness or complex shape. For example, the techniques may be used for the molding of complex shaped parts made of high performance thermoplastics sold under the trademarks TORLON and PEEK. Parts made of these polymers perform at extremely high temperatures and stresses generally considered too severe for most thermoplastics. Microwave heating may be the only practical method for processing some composites from incompatible components having very different physical properties or when it is essential to provide rapid and uniform heating of the whole composite structure.

As used herein, the polymer, composite, or ceramic materials to be processed in the mold cavity may be referred to as the work material or material to be molded and the part or component to be formed thereby may be referred to as the work piece or molded part. The working materials may be supplied in pellet, powder, liquid or solid form. The method of preheating of polymer molding powders and pellets still comprises a substantial market despite the widespread use of injection molding, because for certain end products, compression molding is to preferred. For injection molded parts thickness is limited by the flow length versus the thickness relationship of the polymer. For example, TORLON parts over ⅝ inches thick must be compression-molded. Preheating of TORLON with conventional techniques is very slow due to poor thermal conductivity of the polymer. Heat flows from the polymer surface toward interior regions due to thermal conductivity which therefore necessitates an extended period of heating time to equalize the temperature through the entire volume of the working material without overheating of its surface. The heating cycle time using conventional heating means may exceed several hours depending on the thickness of the part to be molded. Increased cycle time result in high energy consumption and boosts the per unit parts cost.

Molding of high performance polymers in microwave ovens is very advantageous since it significantly reduces heating time, energy consumption and is believed to provide the desired uniformity of temperature throughout the work piece. Such a molding process may be performed using a ceramic mold designed for a particular polymer material and the shape of the resulting work piece. Means for compaction of polymer powder or pellets in the mold cavity is part of mold assembly and provides the necessary compaction of the pelleticized or powdered working material after reaching its melting temperature and for removing air voids from the material.

Usually it is desirable to have high compaction of the molded polymer for mechanical strength. The molding process may require employment of hydraulic presses, which generally are not compatible with the microwave oven cavity. In these cases, it is preferable to use the microwave mold for uniform preheating of the polymer working material, primary compaction of the working material and removal of air voids. Upon reaching the desired process temperature and primary compaction, the mold assembly with the partially compacted, molten working material may be transferred from the microwave oven into the press to finish the compaction under the desired pressure. Narrow metal rings may be used to reinforce the ceramic mold. Alternatively the softened and compacted preformed polymer may be transferred into the mold cavity of a conventional metal compression mold for final processing. Such a molding process will allow the use of simple shaped polymer preforms of uniform thickness and will significantly simplify the design of the microwave mold, reduce its cost as well as the cost of the overall process.

In the embodiment relating to molding of the working material into a workpiece of variable thickness, the employed apparatus includes two mold halves typically made of microwave absorbing ceramic material with selective additives to equalize selected properties of the material forming the mold and the working material. The mold assembly also includes means for applying compression forces to advance the mold halves toward each other to close the mold assembly. The mold assembly is positioned in the cavity of a multimode microwave oven with relatively uniform electric field in a selected volume of the microwave cavity which is larger than the dimensions of the mold assembly. Specially designed microwave ovens and the means for providing a uniform electric field in the microwave cavity are discussed above.

Figure 1:
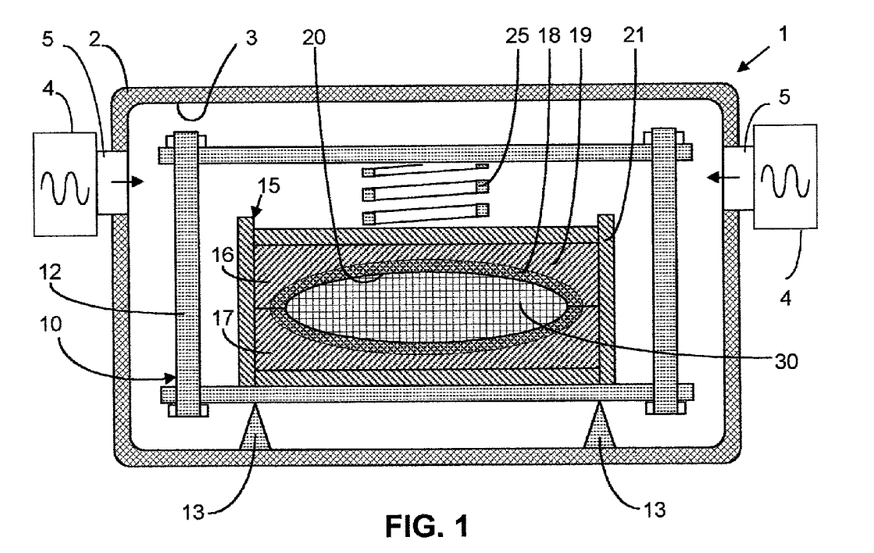
FIG. 1 is a cross-sectional view a mold of the present invention adapted to form the working material into a variable thickness workpiece and positioned in the cavity of microwave oven having a uniform electric field.

FIG. 1 is a representative view of a mold assembly for demonstrating a mold in which uniform heating of polymer material within the mold cavity may be obtained in molding the working material into a work piece which does not have a uniform thickness. As shown in my previous U.S. Pat. No. 6,241,929, providing for the uniformity of the electric field in the mold cavity is a necessary condition but is not enough to provide for uniform heating of the working material. It is also necessary to maintain equal temperature rise ratings of the working material and the inner mold layer adjacent to the working material, which will eliminate heat exchange on the interface between the mold and the working material. The method for designing such a mold was disclosed in the "929" Patent. According to this method, uniform heating of a variable thickness workpiece may be achieved in a uniform electric field if the dielectric constant, $\epsilon$, and the thermosensitivity, $\tan\epsilon/c\rho$, of inner mold layer and the working material are equalized.

FIG. 1 generally comprises a diagrammatic view of a microwave oven 1 including a housing 2 defining a microwave resonance cavity 3 into which microwave energy is directed from a generator 4, such as a magnetron, through a wave guide 5 or similar means such as an antenna. The microwave oven shown in FIG. 1 is representative of a multimode microwave oven having a plurality of generators 4 and waveguides 5 (two of each are shown) for generating and directing microwave energy into the microwave resonance cavity to create a uniform electric field.

A mold assembly 10 is shown positioned in the microwave resonance cavity 3. The mold assembly 10 includes a frame 12 supported above a floor of the housing 2 by spacers 13. A mold 15 is supported on a bottom surface of the frame 12. The mold 15 generally comprises two mold halves 16 and 17, each consisting of an inner mold layer 18 formed from a first mold material and an outer mold layer 19 formed from a second mold material. Both the inner and outer mold layers 18 and 19 surround a mold cavity 20 which is formed by the inner mold layer 18 of each mold half 16 and 17. The mold 15 also may contain thermal insulating layers 21 to reduce heat radiation from the hot mold during the heating cycle. One means for compressing the two mold halves 16 and 17 together is shown as a spring 25 having one end abutting against a ceiling of the frame 12 and another end abutting against the upper mold half 16. It is foreseen that a wide variety of compressing means could be utilized including different types of springs. The materials employed to from the frame 12, spacers 13, spring 25 and insulating layers 21 are preferably transparent to microwaves to reduce microwave energy losses. The working material to be molded into a workpiece 30 is positioned in the mold cavity 20 where it is heated by the microwave energy and compressed by the biasing force of the spring 25 acting on the upper mold half 16 to form the workpiece into the desired shape. For the mold shown on FIG. 1 it is necessary to provide following conditions for uniform heating of the workpiece 30:

a uniform electric field through entire volume of workpiece 30, zero heat exchange across the interface between the working material and the inner mold layer 18.

It is shown that, for a variable thickness workpiece 30, the material forming the inner and outer mold layers 18 and 19 should be selected to equalize the dielectric constants of the working material and the material forming the inner and outer mold layers 18 and 19. Placing the mold 15 containing working material into a uniform electric field of a microwave oven will provide a substantially uniform electric field through the entire mold structure regardless of the shape of the workpiece 30 thereby providing the first condition noted above. To satisfy the second condition, the material forming the inner mold layer 18 should also be selected (by adding additives) to provide equality of the thermosensitivity of the working material and the material forming the inner mold layer 18. This will provide for equal temperature rise ratings for both the inner mold layer 18 and the working material during the heating cycle and providing zero heat exchange on the interface between the working material and the inner mold layer. As a result, an even temperature field will be established through the entire volume of the workpiece 30.

Figure 2:
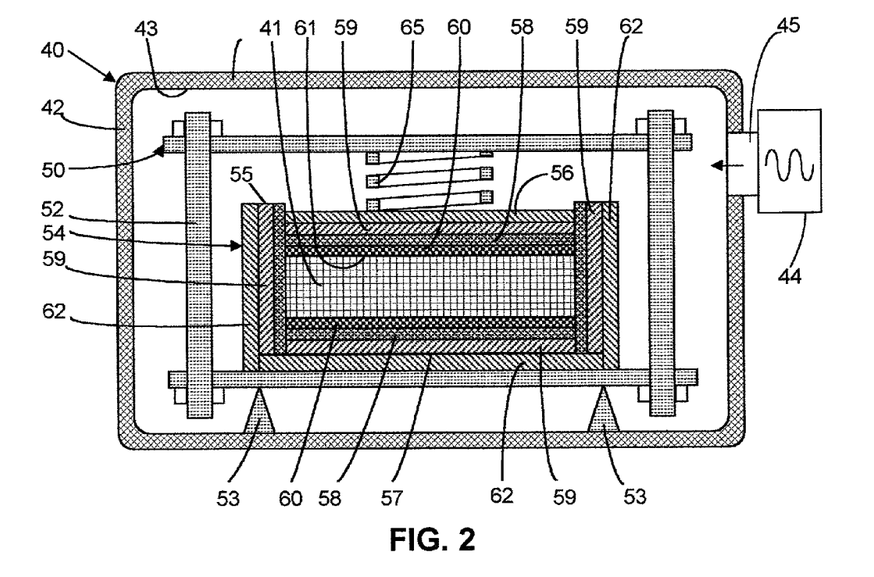
FIG. 2 is a cross-sectional view of an alternative embodiment of the mold of the present invention adapted to form the working material into a workpiece of uniform thickness and positioned in the cavity of either a microwave oven having a uniform field or a conventional microwave oven.

FIG. 2 is a diagrammatic view of an alternative embodiment of the present invention showing use of a conventional microwave oven 40 for molding a workpiece 41 of uniform thickness having parallel planar surfaces. The conventional microwave oven 40 similarly includes a housing 42 enclosing a microwave resonance cavity 43 but utilizes only a single generator or magnetron 44 and waveguide 45 (or similar means such as an antenna) for generating and directing microwave energy into the microwave resonance cavity 43.

The workpiece 41 is molded in a mold assembly 50 which is shown positioned in the microwave resonance cavity 43. The mold assembly 50 includes a frame 52 supported above a floor of the housing 42 by spacers 53. A mold 54 is supported on a bottom surface of the frame 52. The mold 54 generally comprises a cylindrical multiple layer sidewall member 55 and upper and lower mold halves 56 and 57. Sidewall member 55 and each mold half 56 and 57 include what may be generally referred to as an inner or first mold layer 58 formed from a first mold material and an outer or second mold layer 59 formed from a second mold material. In addition, each mold half 56 and 57 includes a metal plate 60 with high thermal conductivity positioned in abutting relationship with the parallel planar surfaces formed by the inner mold layer 58 on the upper and lower mold halves 56 and 57 as shown in FIG. 2. The metal plates 60 generally define outer planar surfaces of a mold cavity 61 in which the workpiece 41 is molded. The inner and outer mold layers 58 and 59 generally surround the mold cavity 61.

As used herein, reference to the metal plates having high thermal conductivity indicates that the thermal conductivity of the metal plates is high in comparison to the thermal conductivity of the selected working material. It is foreseen that copper, gold, silver, aluminum and other metals or alloys of similar or equivalent thermal conductivity would qualify as having high thermal conductivity.

The mold 54 also may contain thermal insulating layers 62 to reduce heat radiation from the hot mold during the heating cycle. Means for compressing the two mold halves 56 and 57 together is shown as a spring 65 having one end abutting against a ceiling of the frame 52 and another end abutting against the upper mold half 56. It is foreseen that a wide variety of compressing means could be utilized including hydraulic drive means or different types of springs. The materials employed to form the frame 52, spacers 53, spring 65 and insulating layers 62 are preferably transparent to microwaves to reduce microwave energy losses. The working material to be molded into a workpiece 41 is positioned in the mold cavity 61 where it is heated by the microwave energy and compressed by the biasing force of the spring 65 acting on the upper mold half 56 to form the workpiece into the desired planar shape.

Figure 3:
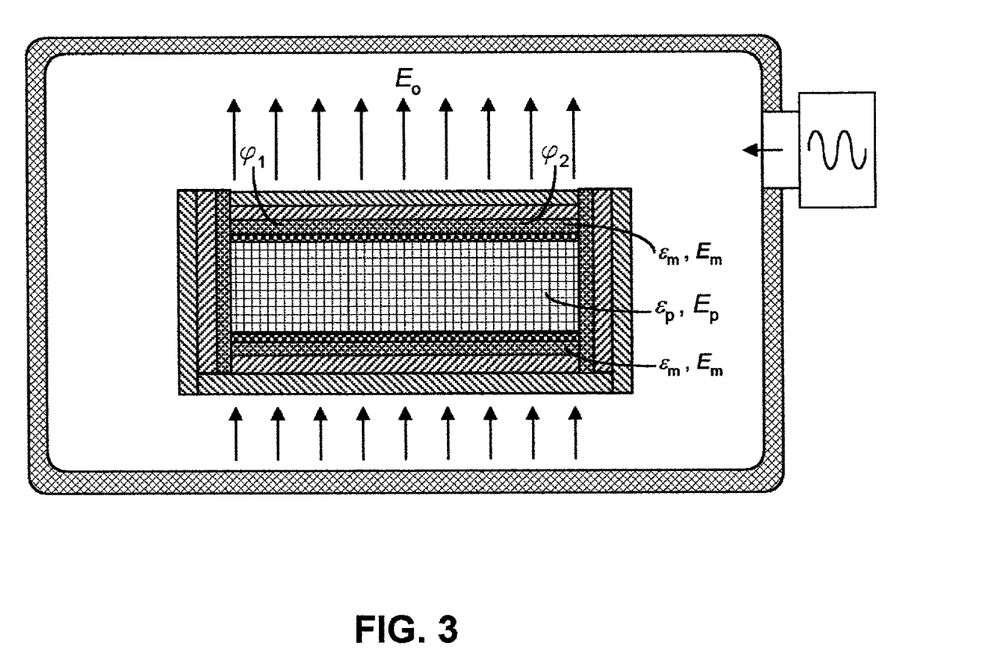
FIG. 3 is a cross-sectional view of a planar mold structure, which is helpful in deriving some relations between dielectric constants, electric fields and heat ratings of planar mold layers.

Planar structures represent a particular case distinct from objects of variable thickness. The electric field in a planar structure may be uniform in spite of the fact that the dielectric constants of mold and work material may be different. As it will be shown hereafter, such sandwich structure containing electrically conducting layers will correct the field in the cavity of a conventional microwave oven making it relatively uniform. However, the second condition for uniform heating of planar structures is significantly different from that for workpieces of variable thickness as will be discussed hereafter with reference to FIG. 3. FIG. 3 comprises a diagrammatic, cross-sectional view of a planar mold structure, such as the mold 54, shown positioned in the cavity of microwave oven having a uniform electric field or in the cavity of conventional microwave oven. In the "929" Patent it is shown that the temperature rise ratings in the mold and working materials are given by the formulas:

$$\left(\frac{\partial T}{\partial t}\right)_p = 5.56 \times 10^{-11} f \epsilon_p E_p^2 \left(\frac{\tan\delta}{c\rho}\right)_p \tag{1}$$

$$\left(\frac{\partial T}{\partial t}\right)_m = 5.56 \times 10^{-11} f \epsilon_m E_m^2 \left(\frac{\tan\delta}{c\rho}\right)_m \tag{2}$$

Here:
subscripts "p" and "m" refer to plastic (working) and mold materials, respectively,
f=frequency of electromagnetic field,
$\epsilon$=dielectric constant,
E=electric field strenght,
$\tan\delta$=dissipation factor,
c=specific heat,
$\rho$=density,
t=time, and
T=temperature rise.

Uniform heating of the working material in the mold structure is possible only under condition when temperature rise ratings of both the working and mold materials are equal during heating time:

$$\left(\frac{\partial T}{\partial t}\right)_p = \left(\frac{\partial T}{\partial t}\right)_m \tag{3}$$

Equation (3) and formulas (1) and (2) yields:

$$\epsilon_p E_p^2 \left(\frac{\tan\delta}{c\rho}\right)_p = \epsilon_m E_m^2 \left(\frac{\tan\delta}{c\rho}\right)_m \tag{4}$$

The relation between electric fields $\epsilon_p$ and $\epsilon_m$ in the planar working material and mold layers and their dielectric constants $\epsilon_p$ and $\epsilon_m$ is given by known Gauss' formula:

$$\epsilon_p E_p = \epsilon_m E_m \tag{5}$$

Putting (5) into (4) we can obtain the condition of uniform heating for planar structures:

$$\left(\frac{\tan\delta}{\epsilon c\rho}\right)_p = \left(\frac{\tan\delta}{\epsilon c\rho}\right)_m \tag{6}$$

The resulting parameter $\tan\delta/\epsilon c\rho$ may be referred to as "relative thermosensitivity" since it may be found by dividing "absolute thermosensitivity", $\tan\delta/c\rho$, by the dielectric constant, $\epsilon$. Condition (6) may be formulated as the equality of relative thermosensitivities of the mold and working materials. The resulting condition (6) is then compared with the conditions for uniform heating of variable thickness objects in a uniform electric field developed in the "929" Patent. Two conditions for uniform heating of variable thickness objects are:

$$\epsilon_p = \epsilon_m \quad (7)$$

and $$\left(\frac{\tan\delta}{c\rho}\right)_p = \left(\frac{\tan\delta}{c\rho}\right)_m \quad (8)$$

The condition (7) requires equality of dielectric constants $\epsilon_p$ and $\epsilon_m$. In contrast, condition (6) for planar workpieces allows the use of mold and working materials with different dielectric constants $\epsilon_p$ and $\epsilon_m$. The primary goal in selecting the properties of the inner mold-layer, whether positioned immediately adjacent the workpiece, or with the metal plates positioned therebetween, is to provide the same temperature rise as for the workpiece. Another object or goal may be understood from the following analyses of FIG. 3. The uniform electric field in the microwave cavity is characterized by horizontal equipotential planes transverse to electric field lines. The horizontal inner mold layers above and under the workpiece coincide with such equipotential planes. If the electric field in the microwave cavity is not uniform and its equipotential lines cross the horizontal inner mold layers, then some potential difference $\phi_2 - \phi_1$ will appear in the conducting mold layers. This will result in simultaneous appearance of some longitudinal current, which will tend to compensate for this potential difference, causing additional dielectric losses in the volume of these layers. The presence of horizontal conductive mold layers will suppress some modes in microwave cavity and support others in such a way to equalize potentials in these layers making the electric field more uniform. In other words, the second objective or goal of these two horizontal mold layers is to correct the electric field in the mold cavity and provide for uniform heating of the working material.

Further improvement of heating uniformity may be achieved by inserting two metal plates 60 with high thermal conductivity between the inner mold layers 58 and the workpiece 41 as is shown in FIG. 2 and described above. These metal plates 60 may be made from copper or aluminum. Their thickness depends on the thickness of the workpiece 41 and may be found by trial and error. Due to their high thermal conductivity, these metal plates 60 will eliminate thermal gradients in the longitudinal direction making the temperature field inside the workpiece 41 more uniform. The metal plates 60 may also participate in correcting the electric field inside the mold cavity 61. It may be concluded that the electrically conductive dielectric inner mold layers 58 together with highly thermal conductive metal plates 60 may provide efficient control of the uniformity of the temperature field in the volume of the workpiece 41. This will allow use of a conventional microwave oven for microwave processing of polymers and composites. The efficiency of such a mold design will be shown hereafter in Examples 4–7.

It should be noted that placing metal plates 60 in intimate contact with the working material or workpiece 41 in this case will not cause thermal gradients on the interface between the working material and the metal plates as occurs in the heating process described in U.S. Pat. No. 4,617,439. The presence of the mold layers 58 adjacent to metal plates 60 and the working material will provide even heating and zero thermal gradients across the interfaces. Summarizing, condition (6) is necessary for maintaining uniform heating of the work piece in a planar mold. In condition (6) there is only one controlling parameter: relative thermosensitivity, $\tan\delta/\epsilon c\rho$.

When the value of the relative thermosensitivity of the work material is known, then the material of the inner mold layer may be selected by adjustment of the percentage of additive material added to the base mold material. In contrast to planar structures, in the case of variable thickness objects there are two controlling parameters: dielectric constant and thermosensitivity, $\tan\delta/c\rho$. This is much more difficult to satisfy when selecting mold materials and additives. It is important to note that if the dielectric constants of the mold and working materials in planar structures are selected to be equal $$\epsilon_p = \epsilon_m,$$

then condition (6) is transformed into conditions (7) and (8) for variable thickness objects. The simplicity of the mold design for planar workpieces in comparison with variable thickness workpieces and the opportunity to use conventional microwave ovens will be particularly appreciated by process users in microwave processing of polymers and composites.

Next, we consider the technique for matching the controlling parameters of the mold and working materials. These technique were developed and described in detail in the "929" Patent for variable thickness workpieces. Here we will disclose the technique for matching the controlling parameters for both cases of variable thickness and planar workpices. The technique is oriented for processing high performance polymers such as TORLON, PEEK and the like, or composites. Conventional silicon based dielectric molds do not have the required mechanical and thermal strength to serve under extreme conditions during processing of high performance thermoplastics. The molding temperature for such thermoplastics may exceed 400° C. and the applied pressure is usually above 2000 psi. Silicone Carbide, SiC was chosen as the base material for the inner layer of a ceramic mold. SiC effectively absorbs RF and microwave energy in a wide temperature range and can be heated easily and quickly from room temperature to well above 500° C. Alumina Silicate, $Al_2O_3$—$SiO_2$, or the like may be used as a second base material for the outer mold layer due to its very low dissipation factor and thermal conductivity. The preferred technique is to modify the base mold materials by adding different additives. The base mold materials and additives, which may be used are as follows:

a) SiC—first base mold material for inner layer; has very high dissipation factor, b) Alumina, $Al_2O_3$—additive with low dissipation factor for reducing absolute and relative thermosensitivities of inner mold layer, c) $Al_2O_3$—$SiO_2$—second base mold material for outer mold layer with very low dissipation factor and thermal conductivity, d) Barium Titanium Oxide,$BaTiO_3$—additive with very high dielectric constant and very low dissipation factor to increase dielectric constants of first and second mold materials, e) hollow glass or ceramic microspheres—additives with very low dielectric constants and dissipation factors to reduce dielectric constants of first and second base mold materials.

When designing a mold for variable thickness workpieces, SiC may be used as the first base mold material forming the inner mold layer. $Al_2O_3$, $BaTiO_3$, hollow glass or ceramic microspheres may be added to approach the controlling parameters for the dielectric constant and the thermosensitivity of the inner mold layer to those of the working material. $Al_2O_3$—$SiO_2$ may be used as a second base mold material forming the outer mold layer, while $BaTiO_3$, or hollow glass or ceramic microspheres may be added to the second mold material to modify its dielectric constant to approach the dielectric constant of the working material.

When designing a mold for a planar workpiece, SiC may be used as a first base mold material forming an inner mold layer. $Al_2O_3$ may be added to control the relative themosensitivity of the inner mold layer and modify it to approach the relative thermosensitivity of the working material. $Al_2O_3$—$SiO_2$ may be used as a second mold material for the outer mold layer and typically does not require any additives since it has a very low relative thermosensitivity. The dielectric constant of the first and second mold materials may differ from the dielectric constant of the working material when designing the mold for a planar workpiece. The value of the relative thermosensitivity of the working material should be determined beforehand from the material data sheet for the material used. After determining the proper percentage of the additives, the mixture of SiC and $Al_2O_3$ powders is consolidated into the desired shape by conventional methods of ceramic processing. By controlling the amount of the additives added to the first base mold material, the desired mold material may be created for a wide range of thermal, mechanical and dielectric properties of polymers to be processed.

Dielectric properties of the material prepared for the inner mold layer may be examined by making small samples of the mold and working materials, then heating them together in a microwave oven for a short period of time (approximately 10–20 seconds). Usually, samples have the shape of the disk, ¼ inch thick and approximately 2 inches diameter with flat surfaces. These samples should be stacked vertically in the direction of the electrical field without an air gap therebetween. Immediately after heating, the temperature of each sample is measured and compared. When temperature ratings are equal, it will indicate that their controlling parameters, $tan\epsilon/\epsilon c\rho$, are approximately equal.

Some small adjustments of the inner mold layer materials may be required to compensate for heat exchange between the inner and outer mold layers during the heating process. Such adjustments may be very helpful for controlling the compaction and consolidation process of the working material. If the top and/or bottom inner mold layers are made from a material with a little lower relative thermosensitivity than that of the working material, then compaction and consolidation of the working material will start from its inner domain and then spread to the rest of its volume. This will allow air to more readily escape or release from voids in the initially pelleticized or powdered working material and will eliminate air from being trapped inside the finished workpiece. By small adjustments of the relative thermosensitivity of the materials forming the side, top, and bottom inner mold layers a variety of desired regimes or heating patterns may be provided for compaction and consolidation of the working material.

The experimental molds were designed for molding and curing different thermoplastic, thermoset materials and composites and were tested in RF (radio frequency) and microwave frequency ranges.

EXAMPLE 1

A mold was designed for PVC (polyvinyl chloride) in accordance with the techniques described above. Pellets of PVC were poured into the cavity defined by the inner mold layer which was formed from SiC—$Al_2O_3$. The mold and PVC pellets were then heated in a uniform RF field at the frequency f 27.12 MHz for approximately 2 minutes under pressure of approximately 30 psi. The cavity was 2.7 inches in diameter and 1.5 inches deep. The uniformity of heating of the PVC pellets to form a work piece was examined visually since the molded PVC part was transparent. The obtained molded samples demonstrated uniformity of heating.

EXAMPLE 2

A mold was designed for TORLON thermoplastic and tested as in Example 1. Instead of pellets, two solid disks of TORLON, grade 4301, 2.7 inches in diameter and 0.5 inches thick were used for molding. After heating for approximately 3 minutes in an RF field, both disks were melted forming a uniformly solid disk of 1 inch thickness. Molding was performed at a pressure of approximately 30 psi.

EXAMPLE 3

A mold was designed for a low loss composite structure containing thermoset silicon resin and fiberglass fabric. About 100 layers of fiberglass fabric were covered by a thin layer of silicon resin grade V-340 made by Rhodia. This composite structure was placed into the mold cavity of 2.7 inches in diameter and heated by RF energy as in Examples 1 and 2. Curing temperature exceeded 150° F. (Fahrenheit) and after 10 minutes of heating time, the composite structure was completely cured. The cured sample had a thickness of approximately 1 inch. Curing of such structure by conventional means would require several hours since silicon-fiberglass composites exhibit a very low thermal conductivity. This test was made to demonstrate the applicability of RF/microwave processing to composite structures.

EXAMPLE 4

A mold was designed for PEEK in accordance with described above technique. PEEK is a high performance thermoplastic and the required temperature for molding is approximately 400° C. A mixture of PEEK pellets and powder of conductive grade 450FC30 (30% carbon) was poured into a mold cavity 5 inches in diameter and compressed by a spring device with a force of approximately 800 pounds. Aluminum discs having a diameter of 5 inches and a thickness ⅛ inch were used as the metal plates 60 for the mold. The mold assembly was placed in the cavity of a multimode microwave oven, model NE-3280 made by PANASONIC. This oven is fed by four magnetrons and has 3.2 kW of microwave power. Molding was completed after 20 minutes of heating time at a relatively low power level (approximately 1.6 kW). After removing the mold assembly from the microwave cavity additional compression was applied in a conventional 2 ton press. The mass of the molded part was approximately 1 pound. A cross-section taken of the samples revealed uniform heating, even melting and good quality of molding. Final processing also may be performed by transferring the melted polymer preform from the dielectric mold into a conventional metal compression mold for molding.

EXAMPLE 5

The same mold with aluminum discs as in Example 4 was loaded with pellets of PEEK of the same conductive grade and heated in the cavity of a conventional microwave oven fed by a single magnetron with microwave power of approximately 1.2 kW. After approximately 20 minutes, the molding process was completed and a cross-section of the solid molded part revealed the same quality of molding as in Example 4. This test demonstrates that the main concept and mold design developed in present invention are true. It also demonstrates new opportunities for polymer processing in non-expensive conventional microwave ovens.

EXAMPLE 6

A mold was designed for molding a workpiece using PEEK as in Examples 4 and 5. The mold cavity was made for molding a thick walled hollow cylinder of approximately 1 pound and having an outside diameter of 5 inches, an internal diameter of 2.3 inches and a height of 1 inch. Two aluminum annular discs of 5 inches in diameter and having a centered opening of 2.3 inches in diameter were used as the metal plates 60 in the mold on opposite sides of the mold cavity. The molding process was performed in the same conventional microwave oven as in Example 5. Heating time was approximately 20 minutes. Examination of a cross-section of the molded part showed good quality of molding as in Example 5.

EXAMPLE 7

A mixture of SiC and Ultem grade 2300 powders (2:1 by weight) was poured into a small mold as in Examples 1–3 and molded in the cavity of a conventional microwave oven. Aluminum discs of 0.1 inch thickness were used as metal plates 60 in the mold. Thermoplastic Ultem 2300 has a very low dissipation factor and cannot be heated by microwave energy, while SiC has a very high dissipation factor and is easily heated by microwave energy. The resulting ceramoplastic material is very hard and has the property of ceramic and, but it also has the properties of a thermoplastic material and is machinable. This test is another illustration of the capabilities of the developed molds for processing different composites.

Based on above analysis and on results of these tests, a conclusion was made that planar molds due to their simplicity and their ability to provide uniform heating in a conventional microwave oven are preferable for molding both planar and variable thickness objects of complex shapes. In both these cases, planar preform is molded from pellets or powder in a microwave oven having a uniform electric field or in conventional microwave oven by the disclosed method and apparatus. For molding variable thickness workpieces of complex shape, molded planar preform may be transferred from the dielectric mold into a conventional metal mold for final molding of three-dimensional complex shape parts. When polymer preform is uniformly preheated and compacted, the mold may be closed almost at once because the material is already hot enough to flow. With uniformly heated preform, the conventional metal mold is not called upon to increase but merely to maintain the temperature. Also, less pressure will be required for molding. The reduced heating demands and pressure requirements results in considerable savings on energy usage.

The absorption of microwave energy by different polymers may vary widely. Some polymers are transparent to microwaves while others may be highly conductive and require some care during microwave processing. Most TORLON grades are good candidates for RF/microwave processing and may be effectively heated from room temperature. With regard to PEEK, its conductive grades 450CA30 and 450FC30 may be easily heated from room temperature since they have a relatively high dissipation factor at room temperature. Other PEEK grades have very low dissipation factors (approximately 0.003) and will not heat when subjected to microwave radiation at room temperature. If these PEEK materials of low loss grades are preheated by conventional means up to 160° C., their dissipation factor rapidly increases to values over 0.02. Starting at or above 160° C., these thermoplastics may be effectively heated and molded by the above described technique. The examples of RF/microwave processing discussed above demonstrate the utility of the method and apparatus disclosed in the present invention for effective RF/microwave processing of high performance polymers.

It is to be understood that while certain forms of the present invention have been illustrated and described herein, it is not to be limited to the specific forms, arrangement of parts, combinations of ingredients or process steps described and shown.

What is claimed is:

1. A process for creating a mold for use in a microwave oven having a uniform electric field for providing relatively uniform heating of a polymeric working material positioned in a mold cavity of said mold to a molding temperature at which said polymeric working material may be molded; said process comprising:
   a) forming said mold of a ceramic mold material having a dielectric constant and a thermosensitivity approximately equal to a dielectric constant and a thermosensitivity of said polymeric working material, such that application of said microwave field across said mold assembly results in relatively uniform heating of said polymeric working material to said molding temperature.

2. The process as in claim 1 wherein said ceramic mold material comprises a first ceramic mold material and wherein:
   a) said step of forming said mold comprises forming said first ceramic mold material into an inner mold layer adjacent said mold cavity and forming an outer layer of said mold from a second ceramic mold material adjacent said inner mold layer; said second ceramic mold material having a dielectric constant approximately equal to the dielectric constant of said first ceramic mold material and said polymeric working material and said second ceramic mold material having a thermosensitivity which is lower than the thermosensitivity of said first ceramic mold material and said polymeric working material.

3. The process as in claim 2 wherein:
   a) said step of forming said mold includes selecting said first ceramic mold material to have a thermosensitivity approximately equal to the thermosensitivity of the polymeric working material and selecting said second ceramic mold material to have a thermosensitivity which is lower than the thermosensitivity of said first ceramic mold material by at least ten times.

4. A process for creating a mold for use in a microwave heating apparatus for providing relatively uniform heating of a polymeric working material positioned in a mold cavity of the mold to a molding temperature at which the polymeric working material may be molded through the exposure of the mold and the polymeric working material to a uniform microwave field; the process comprising:

a) determining the dielectric constant and thermosensitivity of the polymeric working material;

b) selecting a first ceramic base mold material and determining the dielectric constant and the thermosensitivity of the first ceramic base mold material;

c) identifying one or more first additive materials which may be added to the first ceramic base mold material to produce a first modified mold material having a dielectric constant approximately equal to the dielectric constant of the polymeric working material and a thermosensitivity approximately equal to the thermosensitivity of the polymeric working material;

d) adding the one or more first additive materials to a first quantity of the first ceramic base mold material in an amount sufficient to produce the first modified mold material; and e) forming at least an inner mold layer, adjacent the mold cavity, from the first modified mold material.

5. The process of claim 4 wherein:

a) the step of adding the one or more first additive materials to the first ceramic base mold material includes adding the one or more first additive materials in an amount such that the dielectric constant of the first modified mold material is approximately equal to dielectric constant of polymeric working material.

6. The process of claim 4 wherein:

a) the step of adding the one or more first additive materials to the first ceramic base mold material includes adding the one or more first additive materials in an amount such that the thermosensitivity of the first modified mold material is approximately equal to the thermosensitivity of polymeric working material.

7. The process as in claim 5 further comprising the steps of:

a) identifying a second ceramic mold material and one or more second additive materials to produce second modified mold material having a dielectric constant approximately equal to the dielectric constant of the polymeric working material and a thermosensitivity which is lower than the thermosensitivity of the first ceramic mold material and the polymeric working material; wherein the first and second ceramic mold materials may comprise the same or different material and the first and second additive materials may comprise the same or different material;

b) adding the one or more second additive materials to the second ceramic mold material in an amount sufficient to produce the second modified mold material; and c) forming a second, outer mold layer, adjacent the inner mold layer, from the second modified mold material.

8. The process of claim 7 wherein the thermosensitivity of the first modified mold material is approximately equal to the thermosensitivity of the polymeric working material and the thermosensitivity of the second modified mold material is lower then the thermosensitivity of the first modified mold material by at least ten times.

9. A process for creating a mold for use in a microwave oven for providing relatively uniform heating of a polymeric working material positioned in a mold cavity of said mold to a molding temperature at which said polymeric working material may be molded to form a workpiece of uniform thickness having two parallel planar surfaces through the exposure of the mold and the polymeric working material to microwave radiation in said microwave oven; said process comprising:

a) forming said mold to include a first mold layer of a first ceramic mold material surrounding a mold cavity having two opposed parallel planar inner surfaces, said first ceramic mold material having a relative thermosensitivity approximately equal to a relative thermosensitivity of said polymeric working material, and positioning a metal plate of high thermal conductivity adjacent each of the opposed parallel planar inner surfaces of said first mold layer, such that application of said microwave radiation across said mold results in equal temperature rise ratings of said first ceramic mold material and said polymeric working material to said temperature.

10. The process as in claim 9 wherein:

a) said step of forming said mold further comprises forming a second mold layer from a second ceramic mold material and surrounding said first mold layer, said second ceramic mold material having a relative thermosensitivity which is lower than the relative thermosensitivity of said first ceramic mold material and said polymeric working material.

11. The process as in claim 10 wherein:

a) said step of forming said mold includes selecting said first ceramic mold material to have a relative thermosensitivity approximately equal to the relative thermosensitivity of the polymeric working material and selecting the second ceramic mold material to have a relative thermosensitivity lower than the relative thermosensitivity of said first ceramic mold material by at least ten times.

12. A process for creating a mold for use in a microwave heating apparatus for providing relatively uniform heating of a polymeric working material positioned in a mold cavity of the mold to a molding temperature at which said polymeric working material may be molded to form a workpiece of uniform thickness having two parallel planar surfaces through the exposure of the mold and the polymeric working material positioned therein to the electric field of a microwave oven; the process comprising:

a) determining the relative thermosensitivity of the polymeric working material;

b) selecting a first ceramic base mold material and determining the relative thermosensitivity of the first ceramic base mold material;

c) identifying one or more first additive materials which may be added to the first ceramic base material to produce a first modified mold material having a relative thermosensitivity approximately equal to the relative thermosensitivity of the polymeric working material;

d) adding the one or more first additive materials to a quantity of the first ceramic base mold material in an amount sufficient to produce the first modified mold material having a relative thermosensitivity approximately equal to relative thermosensitivity of the polymeric working material;

e) forming a first layer of the mold from the first modified mold material and forming the first layer to surround a mold cavity and to include two opposed parallel planar inner surfaces;

f) placing a metal plate of high thermal conductivity adjacent each opposed parallel planar inner surface of the first layer of the mold, each metal plate defining an outer surface of said mold cavity.

13. The process of claim 12 wherein:
   a) the step of adding the one or more first additive materials to the first ceramic base mold material includes adding the one or more first additive materials in an amount such that the relative thermosensitivity of the first ceramic mold material is approximately equal to the relative thermosensitivity of the polymeric working material.

14. The process as in claim 12 wherein the process further comprises the steps of:
   a) selecting a second ceramic base mold material and determining the relative thermosensitivity of the second ceramic base mold material;
   b) forming at least a second layer, adjacent the inner layer of each mold half, from the second ceramic base mold material.

15. The process of claim 14 wherein the relative thermosensitivity of the first modified mold material is approximately equal to relative thermosensitivity of the polymeric working material and the relative thermosensitivity of the second ceramic mold material is lower then the relative thermosensitivity of the first modified mold material by at least ten times.

* * * * *